United States Patent
Mulder

(10) Patent No.: US 9,948,676 B2
(45) Date of Patent: Apr. 17, 2018

(54) SYSTEM AND METHOD FOR SECURING DOCUMENTS PRIOR TO TRANSMISSION

(71) Applicant: Workshare, Ltd., London (GB)

(72) Inventor: Matthew Mulder, Ilford (GB)

(73) Assignee: Workshare, Ltd., London (GB)

( * ) Notice: Subject to any disclaimer, the term of this patent is extended or adjusted under 35 U.S.C. 154(b) by 211 days.

(21) Appl. No.: 13/962,096

(22) Filed: Aug. 8, 2013

(65) Prior Publication Data

US 2015/0033283 A1    Jan. 29, 2015

Related U.S. Application Data

(60) Provisional application No. 61/858,154, filed on Jul. 25, 2013.

(51) Int. Cl.
*H04L 29/06* (2006.01)
*H04L 12/58* (2006.01)

(52) U.S. Cl.
CPC ............ *H04L 63/20* (2013.01); *H04L 51/063* (2013.01); *H04L 51/12* (2013.01); *H04L 63/0245* (2013.01); *H04L 63/145* (2013.01)

(58) Field of Classification Search
CPC ..... G06F 2221/2107; G06F 2221/2113; G06F 21/6245; G06F 21/60; G06F 2221/2141; G06F 21/30; G06F 21/64; H04L 12/585; H04L 63/10; H04L 51/08; H04L 67/306; H04L 29/06659; H04L 63/0227; H04L 63/101; H04L 9/32
See application file for complete search history.

(56) References Cited

U.S. PATENT DOCUMENTS

| | | |
|---|---|---|
| 4,479,195 A | 10/1984 | Herr et al. |
| 4,949,300 A | 8/1990 | Christenson et al. |
| 5,008,853 A | 4/1991 | Bly et al. |
| 5,072,412 A | 12/1991 | Henderson, Jr. et al. |
| 5,220,657 A | 6/1993 | Bly et al. |
| 5,245,553 A | 9/1993 | Tanenbaum |
| 5,247,615 A | 9/1993 | Mori et al. |
| 5,293,619 A | 3/1994 | Dean |
| 5,379,374 A | 1/1995 | Ishizaki et al. |

(Continued)

FOREIGN PATENT DOCUMENTS

| | | |
|---|---|---|
| JP | 10177650 | 6/1998 |
| JP | 2004265267 | 9/2004 |

(Continued)

OTHER PUBLICATIONS

Chen et al., Online Dectection and Prevention of Phishing Attacks, © 2006, IEEE, 7 pages.*

(Continued)

*Primary Examiner* — Jeffrey Pwu
*Assistant Examiner* — Baotram Tran
(74) *Attorney, Agent, or Firm* — Sabety + associates, PLLC; Ted Sabety

(57) ABSTRACT

A system and method for securing documents attached to emails is disclosed. The system and method apply security rules to an email as it is being composed to ensure that the security policies have been expressed prior to the email being sent. The security program hooks in to the message object model so that as the message is modified, the security rules are applied to each modification.

28 Claims, 3 Drawing Sheets

(56) References Cited

U.S. PATENT DOCUMENTS

| | | |
|---|---|---|
| 5,446,842 A | 8/1995 | Schaeffer et al. |
| 5,608,872 A | 3/1997 | Schwartz et al. |
| 5,617,539 A | 4/1997 | Ludwig et al. |
| 5,634,062 A | 5/1997 | Shimizu et al. |
| 5,671,428 A | 9/1997 | Muranaga et al. |
| 5,699,427 A | 12/1997 | Chow et al. |
| 5,787,175 A | 7/1998 | Carter |
| 5,801,702 A | 9/1998 | Dolan et al. |
| 5,806,078 A | 9/1998 | Hug et al. |
| 5,819,300 A | 10/1998 | Kohno et al. |
| 5,832,494 A | 11/1998 | Egger et al. |
| 5,890,177 A | 3/1999 | Moody et al. |
| 5,898,836 A | 4/1999 | Frievald et al. |
| 6,003,060 A | 12/1999 | Aznar et al. |
| 6,012,087 A | 1/2000 | Frievald et al. |
| 6,049,804 A | 4/2000 | Burgess et al. |
| 6,067,551 A | 5/2000 | Brown et al. |
| 6,088,702 A | 7/2000 | Plantz et al. |
| 6,128,635 A | 10/2000 | Ikeno |
| 6,145,084 A | 11/2000 | Zuili et al. |
| 6,189,019 B1 | 2/2001 | Blumer et al. |
| 6,212,534 B1 | 4/2001 | Lo et al. |
| 6,219,818 B1 | 4/2001 | Frievald et al. |
| 6,243,091 B1 | 6/2001 | Berstis |
| 6,263,350 B1 | 7/2001 | Wollrath et al. |
| 6,263,364 B1 | 7/2001 | Najork et al. |
| 6,269,370 B1 | 7/2001 | Kirsch |
| 6,285,999 B1 | 9/2001 | Page |
| 6,301,368 B1 | 10/2001 | Bolle et al. |
| 6,321,265 B1 | 11/2001 | Najork et al. |
| 6,336,123 B2 | 1/2002 | Inoue et al. |
| 6,351,755 B1 | 2/2002 | Najork et al. |
| 6,377,984 B1 | 4/2002 | Najork et al. |
| 6,404,446 B1 | 6/2002 | Bates et al. |
| 6,418,433 B1 | 7/2002 | Chakrabarti et al. |
| 6,418,453 B1 | 7/2002 | Kraft et al. |
| 6,424,966 B1 | 7/2002 | Meyerzon et al. |
| 6,449,624 B1 | 9/2002 | Hammack et al. |
| 6,513,050 B1 | 1/2003 | Williams et al. |
| 6,547,829 B1 | 4/2003 | Meyerzon et al. |
| 6,556,982 B1 | 4/2003 | McGaffey et al. |
| 6,560,620 B1 | 5/2003 | Ching |
| 6,584,466 B1 | 6/2003 | Serbinis et al. |
| 6,591,289 B1 | 7/2003 | Britton |
| 6,594,662 B1 | 7/2003 | Sieffert et al. |
| 6,596,030 B2 | 7/2003 | Ball et al. |
| 6,614,789 B1 | 9/2003 | Yazdani et al. |
| 6,658,626 B1 | 12/2003 | Aiken |
| 6,738,762 B1 | 5/2004 | Chen et al. |
| 6,745,024 B1 * | 6/2004 | DeJaco ................ H04L 51/38 709/206 |
| 6,918,082 B1 | 7/2005 | Gross |
| 7,035,427 B2 | 4/2006 | Rhoads |
| 7,085,735 B1 | 8/2006 | Hall et al. |
| 7,107,518 B2 | 9/2006 | Ramaley et al. |
| 7,152,019 B2 | 12/2006 | Tarantola et al. |
| 7,194,761 B1 | 3/2007 | Champagne |
| 7,212,955 B2 | 5/2007 | Kirshenbaum et al. |
| 7,233,686 B2 | 6/2007 | Hamid |
| 7,240,207 B2 | 7/2007 | Weare |
| 7,299,504 B1 | 11/2007 | Tiller et al. |
| 7,321,864 B1 | 1/2008 | Gendler |
| 7,356,704 B2 | 4/2008 | Rinkevich et al. |
| 7,434,164 B2 | 10/2008 | Salesin et al. |
| 7,454,778 B2 | 11/2008 | Pearson et al. |
| 7,496,841 B2 | 2/2009 | Hadfield et al. |
| 7,564,997 B2 | 7/2009 | Hamid |
| 7,570,964 B2 | 8/2009 | Maes |
| 7,624,447 B1 | 11/2009 | Horowitz et al. |
| 7,627,613 B1 | 12/2009 | Dulitz et al. |
| 7,640,308 B2 | 12/2009 | Antonoff et al. |
| 7,673,324 B2 | 3/2010 | Tirosh et al. |
| 7,680,785 B2 | 3/2010 | Najork |
| 7,685,298 B2 | 3/2010 | Day |
| 7,694,336 B2 | 4/2010 | Rinkevich et al. |
| 7,707,153 B1 | 4/2010 | Petito et al. |
| 7,720,256 B2 | 5/2010 | Desprez et al. |
| 7,730,175 B1 | 6/2010 | Roesch et al. |
| 7,788,235 B1 | 8/2010 | Yeo |
| 7,818,678 B2 | 10/2010 | Massand |
| 7,844,116 B2 | 11/2010 | Monga |
| 7,857,201 B2 | 12/2010 | Silverbrook et al. |
| 7,877,790 B2 | 1/2011 | Vishik et al. |
| 7,890,752 B2 | 2/2011 | Bardsley et al. |
| 7,895,166 B2 | 2/2011 | Foygel et al. |
| 7,895,276 B2 | 2/2011 | Massand |
| 7,958,101 B1 | 6/2011 | Teugels et al. |
| 8,005,277 B2 | 8/2011 | Tulyakov et al. |
| 8,042,112 B1 | 10/2011 | Zhu et al. |
| 8,060,575 B2 | 11/2011 | Massand |
| 8,117,225 B1 | 2/2012 | Zilka |
| 8,140,513 B2 | 3/2012 | Ghods |
| 8,181,036 B1 | 5/2012 | Nachenberg |
| 8,209,538 B2 | 6/2012 | Craigie |
| 8,286,171 B2 | 10/2012 | More et al. |
| 8,316,237 B1 | 11/2012 | Felsher et al. |
| 8,326,814 B2 | 12/2012 | Ghods |
| 8,381,104 B2 | 2/2013 | Massand |
| 8,406,456 B2 | 3/2013 | More |
| 8,471,781 B2 | 6/2013 | Massand |
| 8,473,847 B2 | 6/2013 | Glover |
| 8,478,995 B2 | 7/2013 | Alculumbre |
| 8,555,080 B2 | 10/2013 | More et al. |
| 8,620,020 B2 | 12/2013 | More |
| 8,670,600 B2 | 3/2014 | More |
| 8,732,127 B1 | 5/2014 | Rotterdam et al. |
| 8,839,100 B1 | 9/2014 | Donald |
| 8,977,697 B2 | 3/2015 | Massand |
| 9,652,485 B1 | 5/2017 | Bhargava et al. |
| 2001/0042073 A1 | 11/2001 | Saether et al. |
| 2002/0010682 A1 | 1/2002 | Johnson |
| 2002/0016959 A1 | 2/2002 | Barton et al. |
| 2002/0019827 A1 | 2/2002 | Shiman et al. |
| 2002/0023158 A1 | 2/2002 | Polizzi et al. |
| 2002/0052928 A1 | 5/2002 | Stern et al. |
| 2002/0063154 A1 | 5/2002 | Hoyos et al. |
| 2002/0065827 A1 | 5/2002 | Christie et al. |
| 2002/0065848 A1 | 5/2002 | Walker et al. |
| 2002/0073188 A1 | 6/2002 | Rawson |
| 2002/0087515 A1 | 7/2002 | Swannack et al. |
| 2002/0099602 A1 | 7/2002 | Moskowitz et al. |
| 2002/0120648 A1 | 8/2002 | Ball et al. |
| 2002/0129062 A1 | 9/2002 | Luparello |
| 2002/0136222 A1 | 9/2002 | Robohm |
| 2002/0138744 A1 | 9/2002 | Schleicher et al. |
| 2002/0159239 A1 | 10/2002 | Amie et al. |
| 2002/0164058 A1 | 11/2002 | Aggarwal et al. |
| 2003/0009518 A1 | 1/2003 | Harrow et al. |
| 2003/0037010 A1 | 2/2003 | Schmelzer |
| 2003/0051054 A1 * | 3/2003 | Redlich ............... G06F 21/6209 709/246 |
| 2003/0061260 A1 | 3/2003 | Rajkumar |
| 2003/0078880 A1 | 4/2003 | Alley et al. |
| 2003/0093755 A1 | 5/2003 | Ramakrishnan |
| 2003/0097454 A1 | 5/2003 | Yamakawa et al. |
| 2003/0131005 A1 | 7/2003 | Berry |
| 2003/0158839 A1 | 8/2003 | Faybishenko et al. |
| 2003/0191799 A1 | 10/2003 | Araujo et al. |
| 2003/0196087 A1 | 10/2003 | Stringer et al. |
| 2003/0223624 A1 | 12/2003 | Hamid |
| 2003/0237047 A1 | 12/2003 | Borson |
| 2004/0002049 A1 | 1/2004 | Beavers et al. |
| 2004/0031052 A1 | 2/2004 | Wannamaker et al. |
| 2004/0187076 A1 | 9/2004 | Ki |
| 2005/0055306 A1 | 3/2005 | Miller et al. |
| 2005/0055337 A1 | 3/2005 | Bebo et al. |
| 2005/0071755 A1 | 3/2005 | Harrington et al. |
| 2005/0108293 A1 | 5/2005 | Lipman et al. |
| 2005/0138540 A1 | 6/2005 | Baltus et al. |
| 2005/0204008 A1 * | 9/2005 | Shinbrood ............ H04L 51/08 709/206 |
| 2005/0251748 A1 | 11/2005 | Gusmorino et al. |
| 2005/0268327 A1 * | 12/2005 | Starikov ............ H04L 63/0442 726/1 |

(56) References Cited

U.S. PATENT DOCUMENTS

| | | |
|---|---|---|
| 2006/0005247 A1 | 1/2006 | Zhang et al. |
| 2006/0021031 A1 | 1/2006 | Leahy et al. |
| 2006/0047765 A1* | 3/2006 | Mizoi ............... H04N 1/00962 |
| | | 709/206 |
| 2006/0050937 A1 | 3/2006 | Hamid |
| 2006/0059196 A1 | 3/2006 | Sato et al. |
| 2006/0064717 A1 | 3/2006 | Shibata et al. |
| 2006/0067578 A1 | 3/2006 | Fuse |
| 2006/0069740 A1 | 3/2006 | Ando |
| 2006/0098850 A1 | 5/2006 | Hamid |
| 2006/0112120 A1 | 5/2006 | Rohall |
| 2006/0129627 A1 | 6/2006 | Phillips |
| 2006/0158676 A1 | 7/2006 | Hamada |
| 2006/0171588 A1 | 8/2006 | Chellapilla et al. |
| 2006/0184505 A1 | 8/2006 | Kedem |
| 2006/0218004 A1 | 9/2006 | Dworkin et al. |
| 2006/0218643 A1 | 9/2006 | DeYoung |
| 2006/0224589 A1 | 10/2006 | Rowney |
| 2006/0236246 A1 | 10/2006 | Bono et al. |
| 2006/0261112 A1 | 11/2006 | Gates et al. |
| 2006/0271947 A1 | 11/2006 | Lienhart et al. |
| 2006/0272024 A1 | 11/2006 | Huang et al. |
| 2006/0294468 A1 | 12/2006 | Sareen et al. |
| 2006/0294469 A1 | 12/2006 | Sareen et al. |
| 2007/0005589 A1 | 1/2007 | Gollapudi |
| 2007/0025265 A1 | 2/2007 | Porras et al. |
| 2007/0094510 A1 | 4/2007 | Ross et al. |
| 2007/0100991 A1* | 5/2007 | Daniels .................. H04L 51/34 |
| | | 709/224 |
| 2007/0101154 A1 | 5/2007 | Bardsley et al. |
| 2007/0101413 A1 | 5/2007 | Vishik et al. |
| 2007/0141641 A1 | 6/2007 | Fang |
| 2007/0150443 A1 | 6/2007 | Bergholz et al. |
| 2007/0179967 A1 | 8/2007 | Zhang |
| 2007/0192728 A1 | 8/2007 | Finley et al. |
| 2007/0220068 A1 | 9/2007 | Thompson et al. |
| 2007/0253608 A1 | 11/2007 | Tulyakov et al. |
| 2007/0261099 A1* | 11/2007 | Broussard ............ H04L 63/102 |
| | | 726/1 |
| 2007/0261112 A1 | 11/2007 | Todd et al. |
| 2007/0294318 A1 | 12/2007 | Arora et al. |
| 2007/0294612 A1 | 12/2007 | Drucker et al. |
| 2008/0033913 A1 | 2/2008 | Winburn |
| 2008/0034282 A1 | 2/2008 | Zernik |
| 2008/0065668 A1 | 3/2008 | Spence et al. |
| 2008/0080515 A1 | 4/2008 | Tombroff et al. |
| 2008/0082529 A1 | 4/2008 | Mantena et al. |
| 2008/0091465 A1 | 4/2008 | Fuschino et al. |
| 2008/0091735 A1 | 4/2008 | Fukushima et al. |
| 2008/0162527 A1* | 7/2008 | Pizano .................... G06F 21/10 |
| 2008/0177782 A1 | 7/2008 | Poston et al. |
| 2008/0209001 A1 | 8/2008 | Boyle et al. |
| 2008/0219495 A1 | 9/2008 | Hulten et al. |
| 2008/0235760 A1* | 9/2008 | Broussard ............ H04L 63/102 |
| | | 726/1 |
| 2008/0263363 A1 | 10/2008 | Jueneman et al. |
| 2008/0288597 A1* | 11/2008 | Christensen ............ H04L 51/12 |
| | | 709/206 |
| 2008/0306894 A1 | 12/2008 | Rajkumar et al. |
| 2008/0320316 A1 | 12/2008 | Waldspurger et al. |
| 2009/0025087 A1 | 1/2009 | Peirson et al. |
| 2009/0034804 A1 | 2/2009 | Cho et al. |
| 2009/0049132 A1* | 2/2009 | Livne Gutovski ... G06Q 10/107 |
| | | 709/206 |
| 2009/0064326 A1 | 3/2009 | Goldstein |
| 2009/0083073 A1 | 3/2009 | Mehta et al. |
| 2009/0129002 A1 | 5/2009 | Wu et al. |
| 2009/0164427 A1 | 6/2009 | Shields et al. |
| 2009/0183257 A1 | 7/2009 | Prahalad |
| 2009/0241187 A1 | 9/2009 | Troyansky |
| 2009/0319480 A1 | 12/2009 | Saito |
| 2010/0011428 A1 | 1/2010 | Atwood et al. |
| 2010/0049807 A1 | 2/2010 | Thompson |
| 2010/0058053 A1 | 3/2010 | Wood et al. |
| 2010/0064004 A1 | 3/2010 | Ravi et al. |
| 2010/0064372 A1 | 3/2010 | More |
| 2010/0070448 A1 | 3/2010 | Omoigui |
| 2010/0076985 A1 | 3/2010 | Egnor |
| 2010/0114985 A1 | 5/2010 | Chaudhaly et al. |
| 2010/0114991 A1 | 5/2010 | Chaudhary et al. |
| 2010/0124354 A1 | 5/2010 | More |
| 2010/0131604 A1* | 5/2010 | Portilla ................ G06Q 10/107 |
| | | 709/206 |
| 2010/0146382 A1 | 6/2010 | Abe et al. |
| 2010/0186062 A1* | 7/2010 | Banti .................. H04L 63/0263 |
| | | 726/1 |
| 2010/0251104 A1 | 9/2010 | Massand |
| 2010/0257352 A1* | 10/2010 | Errico ..................... G06F 21/32 |
| | | 713/151 |
| 2010/0287246 A1* | 11/2010 | Klos ........................ H04L 29/06 |
| | | 709/206 |
| 2010/0299727 A1 | 11/2010 | More et al. |
| 2010/0332428 A1 | 12/2010 | McHenry et al. |
| 2011/0029625 A1* | 2/2011 | Cheng .................. G06Q 10/107 |
| | | 709/206 |
| 2011/0041165 A1 | 2/2011 | Bowen |
| 2011/0106892 A1* | 5/2011 | Nelson ................ G06Q 10/109 |
| | | 709/206 |
| 2011/0197121 A1 | 8/2011 | Kletter |
| 2011/0225646 A1 | 9/2011 | Crawford |
| 2011/0252098 A1* | 10/2011 | Kumar ................. G06Q 10/107 |
| | | 709/206 |
| 2011/0252310 A1 | 10/2011 | Rahaman et al. |
| 2011/0264907 A1 | 10/2011 | Betz et al. |
| 2011/0276658 A1 | 11/2011 | Massand |
| 2011/0314384 A1* | 12/2011 | Lindgren ............. G06Q 10/107 |
| | | 715/739 |
| 2012/0016867 A1 | 1/2012 | Clemm et al. |
| 2012/0079267 A1 | 3/2012 | Lee |
| 2012/0079596 A1* | 3/2012 | Thomas .................. G06F 21/55 |
| | | 726/24 |
| 2012/0117644 A1 | 5/2012 | Soeder |
| 2012/0133989 A1 | 5/2012 | Glover |
| 2012/0136951 A1 | 5/2012 | Mulder |
| 2012/0136952 A1 | 5/2012 | Mulder |
| 2012/0260188 A1 | 10/2012 | Park et al. |
| 2012/0317414 A1 | 12/2012 | Glover |
| 2012/0324369 A1 | 12/2012 | Safa |
| 2013/0074195 A1* | 3/2013 | Johnston ................. H04L 51/34 |
| | | 726/28 |
| 2013/0074198 A1 | 3/2013 | More |
| 2013/0097421 A1* | 4/2013 | Lim ....................... G06F 21/602 |
| | | 713/167 |
| 2013/0227043 A1* | 8/2013 | Murakami ........... H04L 51/063 |
| | | 709/206 |
| 2013/0246901 A1 | 9/2013 | Massand |
| 2013/0254536 A1 | 9/2013 | Glover |
| 2013/0290867 A1 | 10/2013 | Massand |
| 2014/0115066 A1 | 4/2014 | Massand |
| 2014/0115436 A1 | 4/2014 | Beaver et al. |
| 2014/0181223 A1* | 6/2014 | Homsany ................ H04L 51/08 |
| | | 709/206 |
| 2014/0281872 A1 | 9/2014 | Glover |
| 2015/0026464 A1* | 1/2015 | Hanner, Sr. ......... H04L 63/0245 |
| | | 713/168 |
| 2015/0172058 A1 | 6/2015 | Follis |
| 2016/0350270 A1 | 12/2016 | Nakazawa |

FOREIGN PATENT DOCUMENTS

| | | |
|---|---|---|
| JP | 2007299364 | 11/2007 |
| KR | 20010078840 | 8/2001 |
| KR | 20040047413 | 6/2004 |
| KR | 20060048686 | 5/2006 |
| KR | 20070049518 | 5/2007 |

(56) References Cited

FOREIGN PATENT DOCUMENTS

| KR | 1020080029602 | 4/2008 |
|---|---|---|
| WO | 0060504 | 10/2000 |

OTHER PUBLICATIONS

Bobba et al., Attribute-Based Messaging: Access Control and Confidentiality, © 2010, ACM, 35 pages.*
Karnouskos etal., Active Electronic Mail, © 2002, ACM, 6 pages.*
Bettenburg et al., An Empirical Study on the Risks of Using Off-the-Shelf Techniques for Processing Mailing List Data, @ 2009, IEEE, 4 pages.*
Bindu et al., Sapm War: Battling Ham against Spam, © 2011, IEEE, 6 pages.*
Kaushik et al., Email Feedback: A Policy-based Approach to Overcoming False Positives, © 2005, 10 pages.*
Stolfo et al., AMT/MET: Systems for Modeling and Decting Errant Email. © 2003, IEEE, 6 pages.*
Non-Final Office Action dated Aug. 1, 2012 in Co-Pending U.S. Appl. No. 12/621,429, filed Nov. 18, 2009.
Final Office Action dated Feb. 1, 2013 in Co-Pending U.S. Appl. No. 12/621,429, by More, S., filed Nov. 18, 2009.
Final Office Action dated May 10, 2012 in Co-Pending U.S. Appl. No. 12/209,082, filed Sep. 11, 2008.
Notice of Allowance dated Jul. 8, 2013 in Co-Pending U.S. Appl. No. 12/209,082, by S. More et al. filed Sep. 11, 2008.
Final Office Action dated Apr. 16, 2012 in Co-Pending U.S. Appl. No. 12/177,043, filed Jul. 21, 2008.
Final Office Action dated Aug. 12, 2011 for U.S. Appl. No. 12/209,096, filed Sep. 11, 2008.
Non-Final Office Action dated Dec. 22, 2011 in Co-Pending U.S. Appl. No. 12/209,082.
Non-Final Office Action dated Jan. 9, 2012 in Co-Pending U.S. Appl. No. 12/177,043, filed Jul. 21, 2008.
Non-Final Office Action dated Mar. 11, 2011, in Co-pending U.S. Appl. No. 12/209,096, filed Sep. 11, 2008.
Non-Final Office Action dated Sep. 19, 2011 for U.S. Appl. No. 12/177,043, filed Jul. 21, 2008.
International Search Report of PCT Application No. PCT/US2009/056651, dated Apr. 21, 2010, pp. 1-3.
Written Opinion of PCT Application No. PCT/US2009/056651, dated Apr. 21, 2010, pp. 1-5.
Weiss et al., Lightweight document matching for help-desk applications, In; Intelligent Systems and their Applications, IEEE, Vo. 15, Issue:2, pp. 57-61, ISSN 1094-7167, 2000.
International Search Report of PCT Application No. PCT/US2009/065019 dated Jun. 4, 2010, pp. 1-6.
Written Opinion PCT Application No. PCT/US2009/065019 dated Jun. 4, 2010, pp. 1-5.
International Search Report of PCT Application No. PCT/US2009/056668 dated Apr. 16, 2010, pp. 1-9.
Written Opinion PCT Application No. PCT/US2009/056668 dated Apr. 16, 2010, pp. 1-4.
International Search Report of PCT Application No. PCT/US2009/051313, Mar. 3, 2010, 3 pages.
Written Opinion of PCT Application No. PCT/US2009/051313, Mar. 3, 2010, 4 pages.
"3BClean" http://www.web.archive.org/web/20060216022833/http://www.3bview.com.
"ezClean—Metadata removal utility for Microsoft Office". http://web.archive.org/web/20040804113214/www.kklsoftware.com/products/ezClean/details.asp.
"MIMEsweeper Solutions" https://web.archive.org/web2002020211234/http://www.minesweeper.com/products/default.asp.
"CS MAILsweeper™4.3 for SMTP" by Clearswift LTD (©2002) www.mimesweeper.com.
"ezClean—New Features—version 3.3" http://web.archive.org/web/20040803203232/http://www.kklsoftware.com/products/ezClean/newfeatures.asp.
"ezClean 3.2—New Features" http://web.archive.org/web/20040804034917/http://www.kklsoftware.com/products/ezClean.
"ezClean FAQ" http://web.archive.org/web/20040803202332/http://www.kklsoftware.com/products/ezClean/faq.asp.
"How do I make sure that there is no embarrassing Metadata in any documents that I attach to e-mails? ezClean makes it easy!" http://web.archive.org/web/20040727132558/http:/www.kklsoftware.com.
"Lotus Announces cc:Mail For The World Wide Web; Provides EasyAccess to E-Mail Via The Web" http://www.thefreelibrary.com/print/printarticle.aspx?id=17465051.
"Middleboxes: Taxonomy and Issues," Internet Engineering TaskForce (IETF), RFC 3234 (Feb. 2002).
"MIME (Multipurpose Internet Mail Extensions): Mechanisms forSpecifying and Describing the Format of Internet Message Bodies," Internet Engineering Task Force (IETF), RFC 1341 (Jun. 1992).
"Think Your Deletions are Gone Forever? Think Again! ezClean Makes Metadata Removal Easy!" http://web.archive.org/web/20040727132558/http:/www.kklsoftware.com.
3B Clean: What is the Problem? 3B is the solution http ://web.archive.org/web/20051201012525/http://www.3bview.com/pages/index.php.
3B Transform from 2005 http:/web.archive.org/web/20051216102451/http://www.3bview.com/pages/3bclean.php.
3BOpen Doc Making StarOffice and OpenOffice.org a viable option http://web.archive.org/web/2OO6O823O8291Ihttp:llwww.3bview.com/3bopendoc.html.
3BOpenDoc—Convert documents to and from OSF http:!!web archive .org!web!2006062320 11 04!http:!!www.3 bview.com!3bopendoc_converLODF.html.
Bitform Extract SDK 2005.1 http://web.archive.org/web/20050830 121 253Ihttp:Ilbitform .net/products/securesdk/.
eZclean version 3.3 Installation Guide and Admin Manual http://web.archive.org/web/20050201003914/http://www.kklsoftware.com/documentation/ezClean-AdminManual.pdf.
ezClean version 3.3 Integration Guide for use with CS MailSweeper for SMTP.
Silver, Michael A.; MacDonald, Neil. Plan to Deal with Metadata Issues with Windows Vista. Gartner, Inc.. Dec. 21, 2005.ID No. G00136321.
Simple Mail Transfer Protocol, Internet Engineering Task Force(IETF), RFC 821 (Aug. 1982).

* cited by examiner

SYSTEM AND METHOD FOR SECURING DOCUMENTS PRIOR TO TRANSMISSION

PRIORITY CLAIM

This application claims priority to U.S. Provisional App. No. 61/858,154 filed Jul. 25, 2013 and herein incorporates that application by reference in its entirety.

FIELD OF INVENTION

The present invention generally relates to the field of digital document management and security. More particularly, the present invention relates to methods and systems for determining whether the transmission of a document on a computer network would comply with security policies set by the system operator.

BACKGROUND

In the modern office workplace, documents are now embodied in digital data files. These files are readily transmitted over digital communications networks. The typical office is comprised of several computers that share a local network connection, where all of the computers on that local connection are part of one company or, from a security perspective, one locus. The typical office work involving transactions requires sharing documents between two companies, for example, that is, a document may have to be shared between two network loci. In this case, a document may be transmitted from the local network out across a wider network to some other loci associated with the other company. The security policy of the first company may require that each document be checked prior to such a transmission outside the secure locus.

The problem faced by most computers in the office context is that an email program or other communication program is used to transmit or cause the transmission of the document as a MIME attachment, in the case of email, or in some other way relying on FTP, HTTP or other network protocols. Email is typically insecure, and transmission outside the security locus may be impermissible anyway. Therefore the security policy for each document has to be checked for each such email or other transmission. In the prior art, the email program relies on external code modules to perform the security check. These modules are typically invoked when the email program is given the command to transmit the email message. The problem with this approach is that nothing ensures the order of execution of these external code modules. As a result, this approach is prone to error and therefore is a security vulnerability.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 104 is first introduced and discussed with respect to FIG. 1).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section. Where the specification recites an email program, other communication programs may equally apply. For example, various kinds of instant messaging programs also may be used to transmit documents using FTP or IRC protocols.

The method and system operates on one or more computers. In one embodiment, the user's computer is connected within the secure locus to a local server. The user computer operates the email client, and the server operates as an email server. When the user computer transmits an email it is sent to the server, which then routes the transmission out of the first secure locus to another locus. In another embodiment, the user computer may be a mobile device that may be operating outside the local network and sending emails using a publicly available email server. In this embodiment, if the mobile device (400) retrieves a document from the secure locus, by means of authenticating itself with a document management system that manages a document server (404). The mobile device may still introduce a security vulnerability if the document is attached to an email and transmitted further on to the recipient (402) using a public server (401). In either case, the document has to be reliably checked before the user's email or other communication program attempts to transmit the message containing the document.

Figure 1:
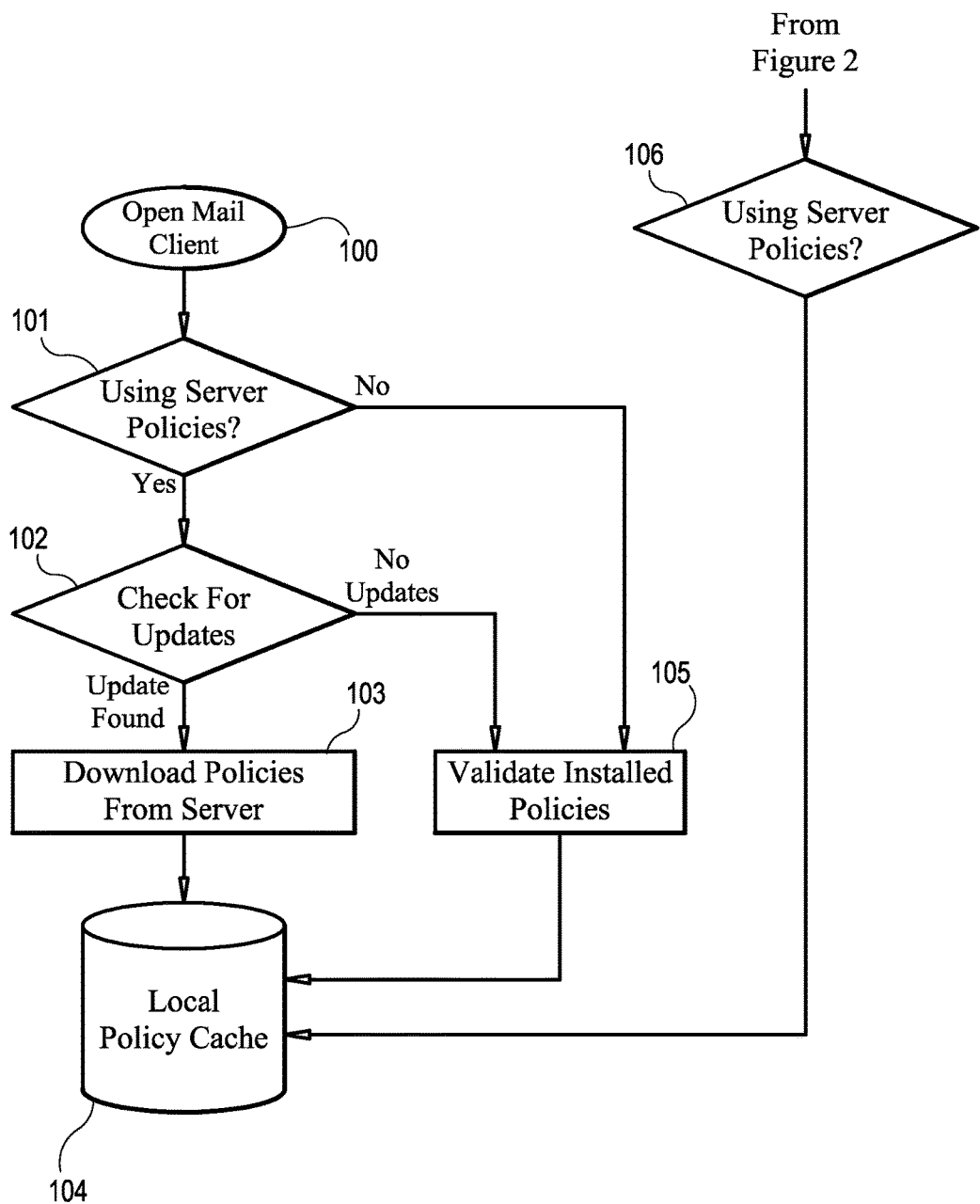
FIG. 01. Flow chart depicting the process of updating security policy rules.

In the preferred embodiment, the server also contains a data structure stored within it that organizes logical rules that are referred to as "policies." The policies dictate how a document that is attached to an email is to be treated. The user computer retains a local cache copy of the current policies. Referring to FIG. 1, when the email client operating on the user's computer 100 launches, it checks whether it is using the server policies 101. If so, then it checks whether there are any updates to the server policies 102. If so, the new policies are downloaded 103, to the local cache 104. By this process, the local email client operating on the user's computer has current security policies for the security locus that it operates in. Once the policies are in place in the local cache, the email client operating on the user computer can then access the policies, which are in the form of logical rules, to process email messages.

Figure 2:
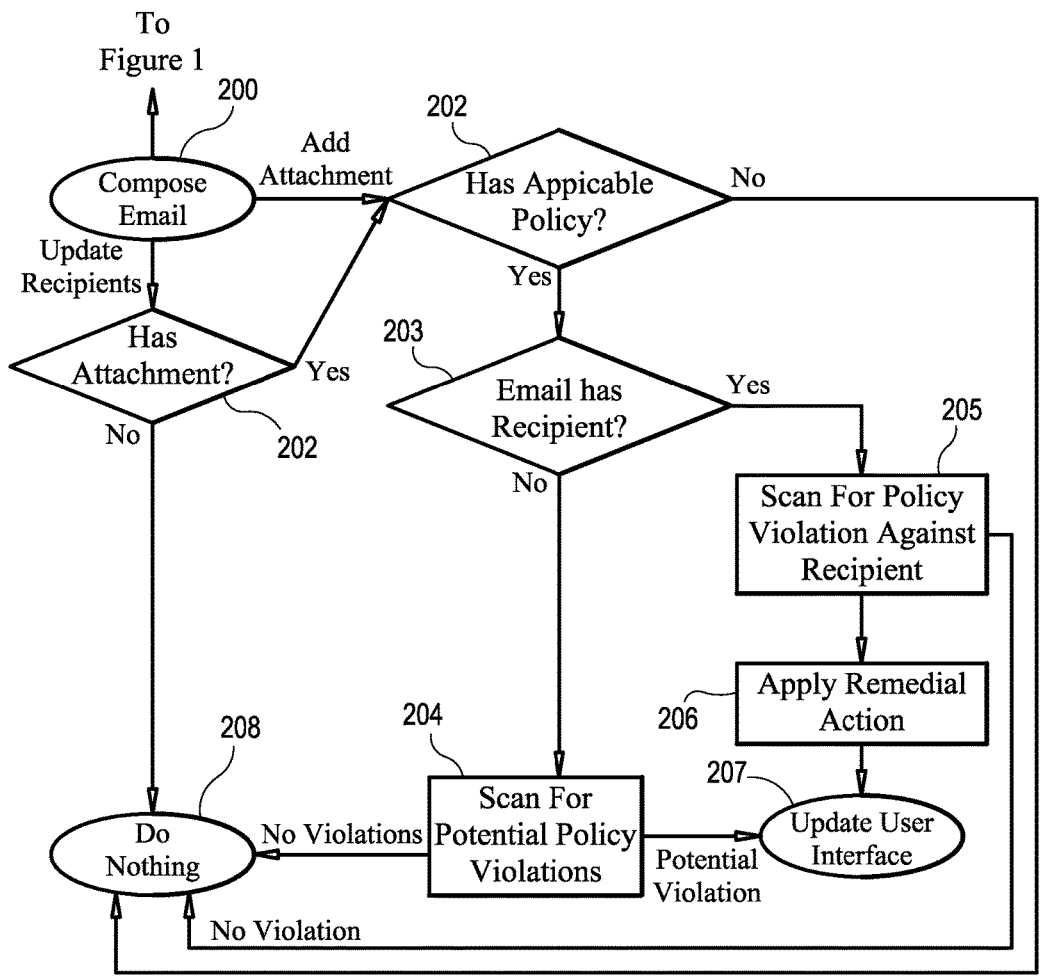
FIG. 02. Flowchart depicting the process of monitoring and checking an email message as it is composed.
Figure 3:
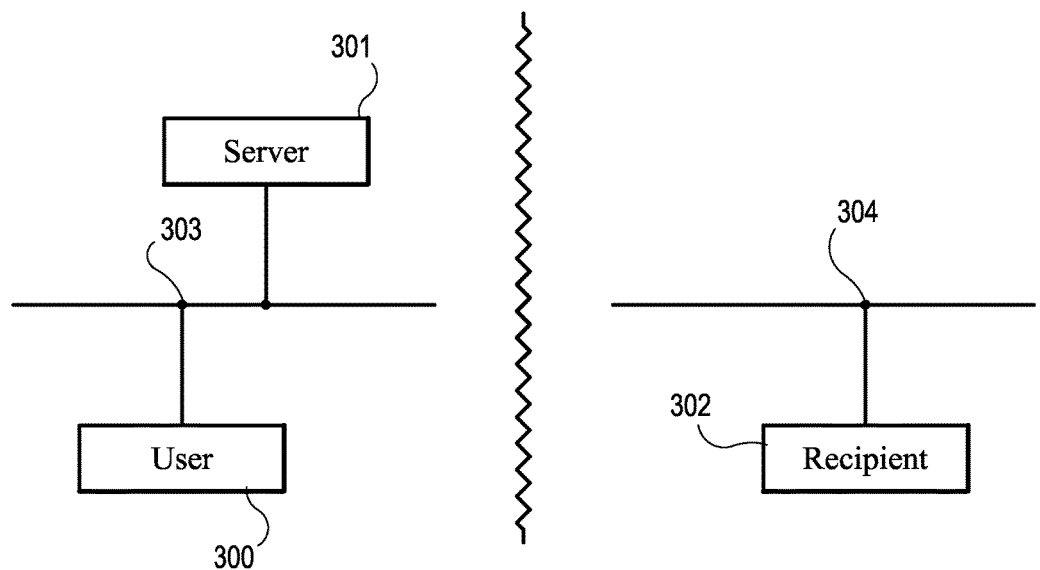
FIG 03. Basic architecture diagram for the system with a secure locus connected to an external locus.
Figure 4:
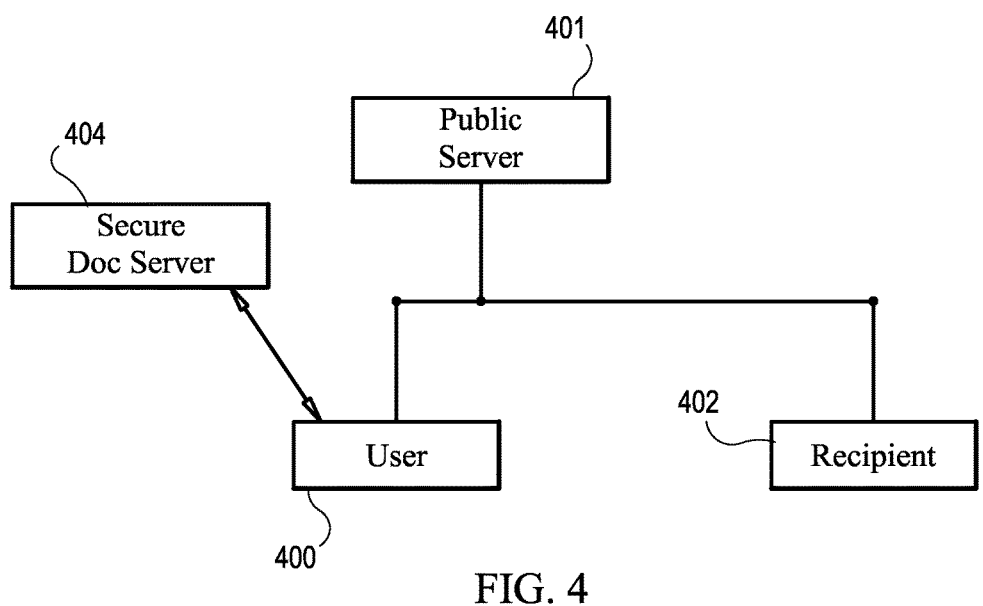
FIG 04. Basic architecture diagram for the system with the user computer operating with a public email server outside of a secure locus.

In one embodiment, the email program operating on the user's computer may be configured so that the documents that are attached to messages, referred to in FIG. 2 as an "attachment", can be transmitted in compliance with the security policies. When the user commands the program to compose an email message, 200, this becomes an interactive process. If the user adds an attachment, the system then checks whether that attachment has an applicable policy 202. If so, then it checks whether the email message, prior to transmission, has a recipient 203. If so, then the system checks whether there is a security policy that applies to that recipient 205. If so, then the system automatically executes a remedial action as indicated by the security policy 206. As a result, the user interface of the user's computer will be modified in order to announce that this has been done 207. Returning now to the email message, if no email recipient has been specified yet, then the email, including the attachment is scanned for security policy violations separate from ones based on recipient identity 204. Returning to the composing of the email, 200, if a recipient gets added to the message, then the system checks whether there is an attachment in the message. If so, then the checking process begins again at 202.

The advantage of this approach is that the outgoing message is checked for adherence to security policies as it is being composed. While prior art approaches to email security execute security checks after the email is designated for sending, this introduces a risk of security failure. To the extent the additional code modules that execute the security checks are external to the email program itself, there is a risk of compatibility problems, where one code module that works with the email, for example, a document management plug-in, conflicts with the security check module. The present invention avoids this problem by running the security checks while the email is being composed. In addition, the email message can automatically be fixed in accordance with the security policies.

The system operates by hooking into the email client program. In one embodiment, the system hooks into the Outlook™ object model. The object oriented computing construct permits the system to respond to the cases when a document is added to a message being composes or when recipients are added. The system creates a temporary file when the email is first created, and then stores logical values representing the results of applying the security policy rules each time the Outlook object model alerts the system that the email message object has been changed, for example, by adding recipients or adding attachments. Each modification of the email message object, while it is being composed, will trigger the security system logic. The system can thereby execute the logic for applying the security policy rules to an email message prior to the message being sent.

In one embodiment, a policy can be expressed in logic that checks whether a destination of a recipient is external to the security locus. The rule may require in those cases that any documents be collapsed into flat images that cannot be modified. Or the rule may prohibit editable document formats from leaving the security locus. And further, the security policy may query a document management system using the filename or other indicia or metadata in the attachment to determine if the document management system has indicated that the document cannot leave the security locus. In that case, the attachment is removed from the email.

In one embodiment, the policy rule can be expressed as conditional logic statement. In the following example, the security rule check whether the email message is going outbound, and if so, whether there is an attachment, and if so, if it is a Word™ document, and if so, it automatically converts it to a PDF and makes that .pdf file the attachment:

```
If  email.recipient.domain  <>home_domain  AND
email.attachment=1  AND email.attachment.extension  =  ".doc"
THEN  email.attachment.filename  =
pdfconvert(email.attachment.filename);
```

In another embodiment, the rule checks the user's authority to transmit a document externally to the security locus, and if the security level doesn't match the security level of the document, then the attachment is removed from the message and a notification is transmitted to a data security officer:

```
If  email.recipient.domain  <>home_domain  AND
email.attachment=1  AND email.sender.security_level  <>
email.attachment.filename.security_level  THEN
(email.attachment=0; notify_security(email.user);)
```

These security policy rules can be stored in a data structure either on the server or on the user's computer. When the system detects a change in the email object, then the security rules can be checked and acted upon.

Another advantage of this approach is that different policies may apply to different recipients. In this embodiment, an email that has a Powerpoint™ file as an attachment may have a recipient within the security locus and a recipient external to that locus. The policy may indicate that any external transmissions of Powerpoint slide decks must be in PDF™ format. As a result, the system can call on additional modules to create a tandem email message to the external recipient that has the same file in the PDF™ format as the attachment, while the first email message for the internal recipients receive the Powerpoint file itself. Similarly, a security policy can call a module that for any external transmission of a document, inserts a confidentiality notice into the first page or footer of each page of the document automatically.

Other types of security policies for attachments can be established by means of establishing rule logic that can be executed by the user system. In one embodiment, the policy rule can apply to the user themselves: a user may not have permission to transmit a particular document, document file type or document department designation. In the case of a department designation, it may be that certain documents are tagged in the document management system as being associated with the human resources department, or the finance department or the research and development department. The policies may encode rules that prohibit certain users from transmitting certain department designated documents outside the security locus. In addition, a security policy may prohibit attaching any document from with particular department designations, for example, human resources or research and development. The security policy can also encode a rule that causes the system to transmit a message to a particular second user in the event a particular security policy is violated. For example, if a low-level user attempts to attach a sensitive research and development document to an email being transmitted to a recipient outside the security locus, this violation can be logged, including making a copy of the message and delivering the message or notice of such message to personnel responsible for data security. In yet another embodiment, the system can record what the user decides to do and thereby create a log that can be used to create a report. In one case, the log is associated with the user's activity, and in another, the log is associated with the document and reports its disposition.

In one embodiment, the sensitivity level of a document is stored in an XML file. In another embodiment, the sensitivity level may be stored in a data record of a database. Further, the sensitivity level may be stored in any kind of data structure that may be used to obtain information corresponding to the document by use of a reference to the document. The sensitivity of a document may also be determined by examining the content of the document itself. In this case, the rules may have actual text strings, or refer to text strings that are considered an item to filter on. For example, a new project called "Breakthrough", may result in a rule that any document containing the word "breakthrough" cannot be emailed out of the security locus, unless the sender is of a certain seniority. More typically, if any document contains the word "confidential" in the header or footer, then the document is not transmitted.

An additional security policy rule can be that if a predetermined word or phrase comprised of words is detected, these are automatically redacted, either by deletion of the text (with regard to documents comprised of encoded characters) or by the modification of the actual image of the text in order to obscure the text (for example, but applying a black stripe to the portion of the image that contains the predetermined word or phrase). In this case, the text string is used as a key in the filtering process. A rule can select that the entire sentence containing the word is redacted, or the entire paragraph. Other rules can combine these parameters. For example, an isolated instance of the string may result in the sentence being redacted, but a paragraph containing more than some pre-determined number of instances would then be redacted in its entirety.

In yet another embodiment, the invention deals with what to do with a file that is blocked. In one embodiment, the file can be compressed, for example, in a secure zip file. In another, the file is encrypted. In a third, the file is redacted of the sensitive information and the sent on. In yet another embodiment, the system will upload the file to a secure server location, and then replace the attachment in the email with a hyperlink in the body of the email to that location. In this embodiment, the link can be to a secure portal that prevents the public from accessing the secure server. In addition, the system can associate security attributes to the link, for example, an expiration dates, shareable/non sharable permission code, downloadable or not downloadable permission code, password protected access or an IP address/domain lock. In yet another embodiment, the uploaded document is updated to a new version automatically if the original version is updated. In this case, a document management system will have metadata associated with the blocked document that it may use to determine that a document being saved is subject to a block and that a copy is residing on the secure server. When the document management system authorizes the saving of a new version, it can transmit a message or semaphore to the secure server that causes it to fetch the new version and to place the new version in the place of the older version. Alternatively, the system can transmit the document directly to the secure server. In the absence of a formal document management system, an owner of the updated document can upload the updated version.

In yet another embodiment, a document may be used to create a unique characteristic number by means of processing the encoded characters comprising the document through an algorithm so that the resulting characteristic number is unique to that version of that document. In this case, the characteristic number may be used as a key in a security rule. Alternatively, a code number may be embedded in a document in a manner that is not apparent or easily removed. This may be done using steganography. In this case, the invention may check a document that is attached to an email for this embedded code, or fingerprint, and then based on its value, determine an action to take.

Operating Environment:

The invention may be implemented by means of an algorithmic state machine. The simplest approach uses a two state machine:

00: Wait for a notification of change in the message, then go to State 01.
01: Apply the security rules and return to State 00.

In one embodiment, the state machine may have three states, with three transition conditions:

00: Wait for a notification of change in the message, then go to State 01.
01: Determine what type of security situation is implicated, e.g. recipient, document, or body of the email, then go to State 02.
02: Apply the family of security rules for that type of security situation to the detected change, return to State 00.

In one embodiment of the invention, an administrator can provide a user the privilege of selecting which rules to apply, or simply apply the rule regardless or a combination thereof. In this approach, there is a four state machine:

00: Wait for a notification of change in the message, then go to State 01.
01: Determine what type of security situation is implicated, e.g. recipient, document, or body of the email, display to the user a selection option, then go to State 02.
02: Wait on user input of a selection, then go to State 03.
03: Apply the family of security rules selected by the user the detected change, return to State 00.

Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, minicomputers, mainframe computers, and the like. Indeed, the terms "computer," "server," and the like are used interchangeably herein, and may refer to any of the above devices and systems. In some instances, especially where the mobile computing device 104 is used to access web content through the network 110 (e.g., when a 3G or an LTE service of the phone 102 is used to connect to the network 110), the network 110 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

The user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The system and method described herein can be executed using a computer system, generally comprised of a central processing unit (CPU) that is operatively connected to a memory device, data input and output circuitry (I/O) and computer data network communication circuitry. A video display device may be operatively connected through the I/O circuitry to the CPU. Components that are operatively connected to the CPU using the I/O circuitry include microphones, for digitally recording sound, and video camera, for digitally recording images or video. Audio and video may be recorded simultaneously as an audio visual recording. The I/O circuitry can also be operatively connected to an audio loudspeaker in order to render digital audio data into audible sound. Audio and video may be rendered through the loudspeaker and display device separately or in combination. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The system may be comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture do not limit the claimed invention.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of a website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML or scripting languages that are executed by Internet web-browsers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Also, while processes or blocks are at times shown as being performed in series, these processes or blocks may instead be performed or implemented in parallel, or may be performed at different times.

What is claimed:

1. A method executed by a computer system for securing an electronic message comprised of data stored on the computer system, that is in a state of being composed as a result of a user operating a computer program running on said computer comprising:
   automatically detecting a change in at least one of a plurality of predetermined conditions of the data representing the electronic message during the period that the electronic message is in the state of being composed;
   in response to the automatic detection of the change of the at least one predetermined condition, applying at least one security policy rule to the data representing the electronic message while the electronic message remains in the state of being composed, said at least one security policy being selected by the computer system in dependence on which of the at least one of the plurality of predetermined conditions was detected as having been changed;
   wherein the step of applying at least one of the security policy rule comprises:
      determining a first security indicia for a file attachment to the electronic message;
      determining a second security indicia for the security privilege of the user composing the electronic message;

using the first and second security indicia to determine whether to prevent the file attachment from being transmitted in the electronic message, and in dependence on such determination, either modifying a data structure associated with the electronic message to remove the file attachment from the electronic message or blocking the transmission of the electronic message.

2. The method of claim 1 further comprising:
determining if the detected change of at least one predetermined condition corresponds to an addition of a recipient to the electronic message, and if so, applying at least one security policy rule associated with a characteristic of the recipient added to the electronic message.

3. The method of claim 2 where the characteristic of the recipient is the domain of the recipient's email address.

4. The method of claim 2 where the characteristic of the recipient is the identity of the recipient by name.

5. The method of claim 1 further comprising:
determining if the detected change of at least one predetermined condition corresponds to the addition of the file attachment to the electronic message, and if so, applying at least one security policy rule associated with a characteristic of the file attachment.

6. The method of claim 5 where the characteristic of the file attachment is the file type.

7. The method of claim 5 where the characteristic of the file attachment is an indicia of sensitivity of the file attachment, and the method is further comprised of obtaining from data storage an indicia of sensitivity of the file attachment by using a reference to the file attachment.

8. The method of claim 1 further comprising:
determining if the detected change of at least one predetermined condition corresponds to the addition to the electronic message of the file attachment containing a predetermined one or more words, and if so, applying at least one security policy rule associated with the predetermined one or more words.

9. The method of claim 8 where the predetermined one or more words are determined to be contained in the file attachment by inspecting encoded characters in the file.

10. The method of claim 8 where the predetermined one or more words are determined to be contained in the file attachment by using pattern recognition of a portion of an image comprising the file attachment.

11. The method of claim 8 further comprising:
inspecting the file attachment in order to determine the presence of a code number embedded in the file attachment in a manner that is not readily apparent or easily removed.

12. The method of claim 1 further comprising determining if the detected change of at least one predetermined condition corresponds to an addition of a predetermined one or more words to the body of the electronic message, and if so, applying at least one security policy rule associated with the predetermined one or more words.

13. The method of claim 1 where the step of detecting a change in at least one of a plurality of predetermined conditions is comprised of:
hooking into an object model associated with the electronic message so as to have at least one object method used to determine the change in the condition of the electronic message as it is in the state of being composed.

14. The method of claim 13 where the at least one of the object methods are a first and a second object methods that correspond to the addition of a recipient and the addition of the file attachment, where the first and second object methods express security policy rules corresponding to recipients and file attachments respectively.

15. A system comprised of at least one computer for securing an electronic message comprised of data stored on the computer, that is in a state of being composed as a result of a user operating a computer program running on one of said at least one computers comprising:
a module configured to automatically detect a change in at least one of a plurality of predetermined conditions of the data representing the electronic message during the period that the electronic message is in the state of being composed;
and in response to the automatic detection of the change of the at least one predetermined condition, apply at least one security policy rule to the data representing the electronic message while the electronic message remains in the state of being composed, said at least one security policy being selected by the computer system in dependence on which of the plurality of at least one of the predetermined conditions was detected as having been changed;
wherein the module is further configured to apply at least one security policy rule by:
determining a first security indicia for a file attachment to the electronic message;
determining a second security indicia for the security privilege of the user composing the electronic message;
using the first and second security indicia to determine whether to prevent the file attachment from being transmitted in the electronic message, and in dependence on such determination, either modifying a data structure associated with the electronic message to remove the file attachment from the electronic message or blocking the transmission of the electronic message.

16. The system of claim 15 where the module is further configured to determine if the detected change of condition corresponds to an addition of a recipient to the electronic message, and if so, apply at least one security policy rule associated with a characteristic of the recipient added to the electronic message.

17. The system of claim 16 where the characteristic of the recipient is the domain of the recipient's email address.

18. The system of claim 16 where the characteristic of the recipient is the identity of the recipient by name.

19. The system of claim 15 where the module is further configured to determine if the detected change of condition corresponds to the addition of the file attachment to the electronic message, and if so, apply at least one security policy rule associated with a characteristic of the file attachment.

20. The system of claim 19 where the characteristic of the file attachment is the file type.

21. The system of claim 19 where the characteristic of the file attachment is an indicia of sensitivity of the file attachment, and where the module is further configured to obtain from data storage an indicia of sensitivity of the file attachment by using a reference to the file attachment.

22. The system of claim 15 where the module is further configured to determine if the detected change of condition corresponds to the addition to the electronic message of the file attachment containing a predetermined one or more words, and if so, apply at least one security policy rule associated with the predetermined one or more words.

23. The system of claim 22 where the module is further configured to determine if the predetermined one or more words are contained in the file attachment by inspecting encoded characters in the file.

24. The system of claim 22 where the module is further configured to determine if the predetermined one or more words are contained in the file attachment by using pattern recognition of a portion of an image comprising the file attachment.

25. The system of claim 22 where the module is further configured to inspect the file attachment in order to determine the presence of a code number embedded in the file attachment in a manner that is not readily apparent or easily removed.

26. The system of claim 15 where the module is further configured to determine if the detected change of condition corresponds to an addition of a predetermined one or more words to the body of the electronic message, and if so, apply at least one security policy rule associated with the predetermined one or more words.

27. The system of claim 15 where the module is further configured to detect a change in at least one of a plurality of predetermined conditions by hooking into an object model associated with the electronic message so as to have at least one object method used to determine the change in the condition of the electronic message as it is being composed.

28. The system of claim 27 where the at least one of the object methods are a first and second object method that correspond to the addition of a recipient and the addition of the file attachment, where the first and second object methods express security policy rules corresponding to recipients and file attachments respectively.

* * * * *